United States Patent
Wu

(10) Patent No.: US 9,152,866 B2
(45) Date of Patent: Oct. 6, 2015

(54) LANE DEPARTURE WARNING SYSTEM AND METHOD

(71) Applicant: Sarmo Technology Inc., Taipei (TW)

(72) Inventor: Yi-Tsung Wu, Taipei (TW)

(73) Assignee: Sarmo Technology Inc., Taipei (TW)

( * ) Notice: Subject to any disclaimer, the term of this patent is extended or adjusted under 35 U.S.C. 154(b) by 23 days.

(21) Appl. No.: 14/207,943

(22) Filed: Mar. 13, 2014

(65) Prior Publication Data

US 2015/0125039 A1     May 7, 2015

(30) Foreign Application Priority Data

Nov. 4, 2013   (TW) .............................. 102139923 A

(51) Int. Cl.
  *G06K 9/00* (2006.01)
  *G06K 9/46* (2006.01)

(52) U.S. Cl.
  CPC ........ *G06K 9/00798* (2013.01); *G06K 9/00536* (2013.01); *G06K 9/4604* (2013.01)

(58) Field of Classification Search
  None
  See application file for complete search history.

(56) References Cited

U.S. PATENT DOCUMENTS

2012/0050074 A1*   3/2012   Bechtel et al. ................ 340/988
2012/0072080 A1*   3/2012   Jeromin et al. ................ 701/49

* cited by examiner

*Primary Examiner* — Shervin Nakhjavan
(74) *Attorney, Agent, or Firm* — Woodard Emhardt Moriarty McNett & Henry LLP

(57) ABSTRACT

Provided is a lane departure warning system and method. The lane departure warning system includes an edge style classification map capture module, a road marker seed region detection module, a lane detection module, and a lane departure warning module, which can detect, by using an edge style classification map, and through road marker seed region detection and lane detection, lane edge pixels and identify real road marker edge pixels under a circumstance that there is no obvious gradient change or light is reflected or an obstacle exists, thereby determining a complete lane, and effectively finding a Region Of Interest (ROI) to simplify a procedure of lane detection.

14 Claims, 11 Drawing Sheets

  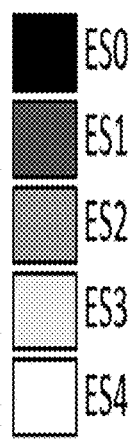
FIG. 2A          FIG. 2B
 
FIG. 2C          FIG. 2D

| 48 | 48 | 48 | 47 | 47 | 48 | 48 | 47 | 50 | 51 | 51 | 52 | 57 | 70 | 110 | 106 |
|---|---|---|---|---|---|---|---|---|---|---|---|---|---|---|---|
| 46 | 46 | 46 | 46 | 47 | 50 | 50 | 50 | 50 | 50 | 51 | 58 | 108 | 109 | 111 | 118 |
| 46 | 46 | 46 | 48 | 48 | 47 | 52 | 53 | 56 | 54 | 98 | 110 | 107 | 112 | 115 | 52 |
| 44 | 44 | 48 | 48 | 49 | 50 | 54 | 60 | 87 | 100 | 104 | 105 | 103 | 87 | 52 | 55 |
| 44 | 44 | 48 | 47 | 50 | 50 | 88 | 105 | 101 | 99 | 103 | 100 | 54 | 56 | 59 | 54 |
| 45 | 43 | 48 | 50 | 71 | 101 | 97 | 103 | 100 | 107 | 61 | 58 | 54 | 54 | 54 | 54 |
| 45 | 46 | 64 | 104 | 100 | 102 | 101 | 107 | 73 | 52 | 56 | 54 | 53 | 51 | 51 | 54 |
| 59 | 98 | 97 | 99 | 97 | 103 | 100 | 47 | 49 | 49 | 49 | 50 | 50 | 50 | 50 | 52 |
| 99 | 100 | 101 | 102 | 109 | 51 | 50 | 51 | 49 | 49 | 49 | 46 | 50 | 50 | 50 | 52 |
| 93 | 93 | 93 | 83 | 48 | 48 | 47 | 48 | 49 | 49 | 49 | 47 | 48 | 48 | 48 | 50 |

FIG. 6A

| 0 | 0 | 0 | 0 | 0 | 0 | 0 | 0 | 0 | 0 | 0 | 0 | 1 | 2 | 3 | 3 |
|---|---|---|---|---|---|---|---|---|---|---|---|---|---|---|---|
| 0 | 0 | 0 | 0 | 0 | 0 | 0 | 0 | 0 | 0 | 0 | 2 | 3 | 3 | 2 | 1 |
| 0 | 0 | 0 | 0 | 0 | 0 | 0 | 1 | 0 | 2 | 3 | 3 | 2 | 0 | 2 | 3 |
| 0 | 0 | 0 | 0 | 0 | 0 | 0 | 2 | 3 | 3 | 2 | 1 | 1 | 3 | 3 | 2 |
| 0 | 0 | 0 | 0 | 0 | 2 | 3 | 3 | 2 | 2 | 1 | 2 | 3 | 3 | 1 | 1 |
| 0 | 0 | 1 | 1 | 2 | 3 | 3 | 2 | 1 | 2 | 3 | 3 | 2 | 1 | 1 | 0 |
| 0 | 1 | 2 | 3 | 3 | 2 | 0 | 1 | 3 | 3 | 2 | 1 | 0 | 0 | 0 | 0 |
| 2 | 3 | 3 | 2 | 0 | 0 | 2 | 3 | 3 | 2 | 1 | 1 | 0 | 0 | 0 | 0 |
| 3 | 2 | 0 | 0 | 2 | 3 | 3 | 2 | 0 | 0 | 0 | 0 | 1 | 0 | 0 | 0 |
| 1 | 2 | 3 | 3 | 3 | 2 | 0 | 1 | 0 | 0 | 0 | 0 | 0 | 0 | 0 | 0 |

| | | | | | | | | | | | 70 | 110 | 106 |
|---|---|---|---|---|---|---|---|---|---|---|---|---|---|
| | | | | | | | | | | 58 | 108 | 109 | 111 |
| | | | | | | | 54 | 98 | 110 | 107 | | 115 | 52 |
| | | | | | 60 | 87 | 100 | 104 | | | 87 | 52 | 55 |
| | | | | 50 | 88 | 105 | 101 | 99 | | 100 | 54 | 56 | |
| | | | 71 | 101 | 97 | 103 | | 107 | 61 | 58 | 54 | | |
| | | 64 | 104 | 100 | 102 | | 73 | 52 | 56 | | | | |
| 59 | 98 | 97 | 99 | | | 100 | 47 | 49 | 49 | | | | |
| 99 | 100 | | 109 | 51 | 50 | 51 | | | | | | | |
| | 93 | 93 | 83 | 48 | 48 | | | | | | | | |

FIG. 6D

| | | | | | | | | | | | | 110 | 106 |
|---|---|---|---|---|---|---|---|---|---|---|---|---|---|
| | | | | | | | | | | 108 | 109 | 111 | 118 |
| | | | | | | | | 98 | 110 | 107 | 112 | 115 | |
| | | | | | | 87 | 100 | 104 | 105 | 103 | 87 | | |
| | | | | | 88 | 105 | 101 | 99 | 103 | 100 | | | |
| | | | | 101 | 97 | 103 | 100 | 107 | | | | | |
| | | | 104 | 100 | 102 | 101 | 107 | | | | | | |
| | 98 | 97 | 99 | 97 | 103 | 100 | | | | | | | |
| 99 | 100 | 101 | 102 | 109 | | | | | | | | | |
| 93 | 93 | 93 | 83 | | | | | | | | | | |

|    | C0 | C1 | C2 | C3 | C4 | C5 | C6 | C7 | C8 | C9 | C10 | C11 | C12 | C13 | C14 | C15 |
|----|----|----|----|----|----|----|----|----|----|----|-----|-----|-----|-----|-----|-----|
| R0 |    |    |    |    |    |    |    |    |    | 0A | 0A  | 0A  |     |     | 0B  | 0B  |
| R1 |    |    |    |    |    |    |    |    |    | 1A | 1A  |     | 1B  | 1B  | 1B  | 1B  |
| R2 |    |    |    |    |    |    |    |    |    |    | 2A  | 2A  | 2A  | 2A  | 2A  |     |
| R3 |    |    |    |    | 3A | 3A | 3A |    | 3B | 3B | 3B  | 3B  | 3B  | 3B  |     |     |
| R4 |    |    |    |    |    | 4A | 4A | 4A | 4A | 4A | 4A  |     |     |     |     |     |
| R5 |    |    |    |    |    | 5A | 5A | 5A | 5A | 5A |     |     |     |     |     |     |
| R6 |    |    |    | 6A | 6A | 6A | 6A | 6A |    |    |     |     |     |     |     |     |
| R7 |    | 7A | 7A | 7A | 7A | 7A | 7A |    | 7B | 7B |     |     |     |     |     |     |
| R8 | 8A | 8A | 8A | 8A | 8A |    |    |    |    |    |     |     |     |     |     |     |
| R9 | 9A | 9A | 9A | 9A |    |    |    |    |    |    |     |     |     |     |     |     |

FIG. 7A

|    | C0  | C1  | C2 | C3  | C4  | C5 | C6  | C7  | C8  | C9  | C10 | C11 | C12 | C13 | C14 | C15 |
|----|-----|-----|----|-----|-----|----|-----|-----|-----|-----|-----|-----|-----|-----|-----|-----|
| R0 |     |     |    |     |     |    |     |     |     | 0AL | -   | 0AR |     |     | 0BL | 0BR |
| R1 |     |     |    |     |     |    |     |     |     | 1AL | 1AR |     | 1BL | -   | -   | 1BR |
| R2 |     |     |    |     |     |    |     |     |     |     | 2AL | -   | -   | -   | 2AR |     |
| R3 |     |     |    |     | 3AL | -  | 3AR |     | 3BL | -   | -   | -   | -   | 3BR |     |     |
| R4 |     |     |    |     |     | 4AL| -   | -   | -   | -   | -   | 4AR |     |     |     |     |
| R5 |     |     |    |     |     | 5AL| -   | -   | -   | 5AR |     |     |     |     |     |     |
| R6 |     |     |    | 6AL | -   | -  | -   | 6AR |     |     |     |     |     |     |     |     |
| R7 |     | 7AL | -  | -   | -   | -  | 7AR |     | 7BL | 7BR |     |     |     |     |     |     |
| R8 | 8AL | -   | -  | -   | 8AR |    |     |     |     |     |     |     |     |     |     |     |
| R9 | 9AL | -   | -  | 9AR |     |    |     |     |     |     |     |     |     |     |     |     |

LANE DEPARTURE WARNING SYSTEM AND METHOD

REFERENCE TO RELATED APPLICATION

This application claims priority from Taiwanese Patent Application No. 102139923, filed on Nov. 4, 2013. The entire content of the Taiwanese application is hereby incorporated by reference into this application.

BACKGROUND OF THE INVENTION

1. Field of the Invention

The present invention relates to the technical field of vehicles, and in particular, to a lane departure warning system and method for vehicles.

2. Related Art

At the present stage, a lane detection algorithm mainly includes two steps: edge detection and line detection, which are mainly applied to detecting a manual lane marker.

In a conventional edge detection algorithm, in a general case (when there is only a simple lane marker with an obvious gradient change, and there are no other complicated situations, such as vehicles, shadows, man-made objects, and trees), a lane marker may be successfully detected and determined. However, in most cases, a real lane marker cannot be detected and determined. For example, in a case where the gradient change is not obvious, the edge detection cannot effectively detect the lane marker. In addition, in a case where light is reflected or an obstacle exists, although edge pixels can be detected, it is very difficult to identify real road marker edge pixels to determine a lane.

In many cases, although the road marker edge pixels can be correctly detected, some complicated steps are further needed to infer the lane from the edge pixels. For example, as for a wider lane marker, because the edge detection can only detect the edge pixels, pixels in the lane marker may be classified as non-edge pixels, and there are some difficulties in inferring the correct lane according to edge pixels on the left and right sides of the lane marker. In addition, as for such conditions as a short lane and a channelizing line, the conventional edge detection algorithm also cannot perform effective processing.

In most cases, the conventional lane detection algorithm belongs to a pixel-based image processing technology. After operations such as the edge detection and the line detection, only pixel-based one-dimensional (1D) information can be obtained, which cannot meet demands of the lane detection needing two-dimensional (2D) information. Therefore, some complicated procedures (for example, points are assembled into a line) are needed, to obtain enough information. However, most of these complicated procedures are time-consuming. Therefore, to improve execution efficiency of a system, many experts and research and development institutions successively put forward a strategy based on a Region Of Interest (ROI), which only performs the lane detection on reserved ROI, thereby improving the efficacy. However, in many cases, the lane may often appear in the non-ROI areas. As a result, the system cannot detect the lane.

SUMMARY OF THE INVENTION

In light of the foregoing problems, an objective of the present invention is to provide a lane departure warning system and method, which can detect edge pixels and identify real road marker edge pixels under a circumstance that there is no obvious gradient change or light is reflected or an obstacle exists, thereby determining a lane, and effectively finding an ROI to simplify a procedure of lane detection.

In a first aspect of the present invention, a lane departure warning system is provided, which captures multiple pixels of an image for data processing. The lane departure warning system comprises:

an edge style classification map capture module, for calculating a horizontal gradient absolute value, a vertical gradient absolute value, and an edge direction value of each pixel of an image, and comparing the horizontal gradient absolute value, the vertical gradient absolute value, and the edge direction value of each pixel with multiple thresholds, so as to classify each pixel into one of multiple edge styles;

a road marker seed region detection module, for dividing the image into multiple sub-boxes, defining, in a specific area of the image, an edge style of a pixel in each sub-box; and performing line feature evaluation on the pixels of the same edge style in the sub-box, to obtain a sub-box of a road marker seed region; and a lane detection module, for determining an intensity threshold on the basis of partial pixels with the line feature in the sub-boxes of the road marker seed region; reserving pixels with an intensity value greater than or equal to the intensity threshold in the sub-box as multiple road marker pixels, obtaining a slope and an offset of a local lane through a straight line equation by using coordinate positions of the road marker pixels in the sub-box, and extending the local lane to other sub-boxes to obtain an extended lane.

In a second aspect of the present invention, a lane departure warning method is provided, which captures multiple pixels of an image for data processing. The lane departure warning method comprises the following steps:

calculating a horizontal gradient absolute value, a vertical gradient absolute value, and an edge direction value of each pixel of an image, comparing the horizontal gradient absolute value, the vertical gradient absolute value, and the edge direction value of each pixel with multiple thresholds, so as to classify each pixel into one of multiple edge styles; dividing the image into multiple sub-boxes, defining, in a specific area of the image, an edge style of a pixel of each sub-box, and performing line feature evaluation on the pixels of the same edge style in the sub-box, to obtain a sub-box of a road marker seed region; and determining an intensity threshold on the basis of partial pixels with the line feature in the sub-boxes of the road marker seed region, reserving pixels with an intensity value greater than or equal to the intensity threshold in the sub-boxes as multiple road marker pixels, obtaining a slope and an offset of a local lane through a straight line equation by using coordinate positions of the road marker pixels in the sub-box, and extending the local lane to other sub-boxes to obtain an extended lane.

BRIEF DESCRIPTION OF THE DRAWINGS

FIG. 2A is a schematic diagram of an image shot by an image sensing component according to the present invention;

FIG. 2B is schematic diagram of the image classified according to edge styles according to the present invention;

FIG. 2C is a schematic diagram of an image shot by an image sensing component according to the present invention;

FIG. 2D is schematic diagram of the image classified according to edge styles according to the present invention;

FIG. 6A to FIG. 6D are illustrative diagrams of road marker detection according to the present invention;

FIG. 7A to FIG. 7D are schematic diagrams of Local Lane Detection (LLD) according to the present invention;

DETAILED DESCRIPTION OF THE INVENTION

To make a person of ordinary skill in the art further understand the present invention, the following lists preferred embodiments of the present invention, and with reference to the accompanying drawings, describes in detail constituted content and efficacy to be achieved of the present invention.

Figure 1:
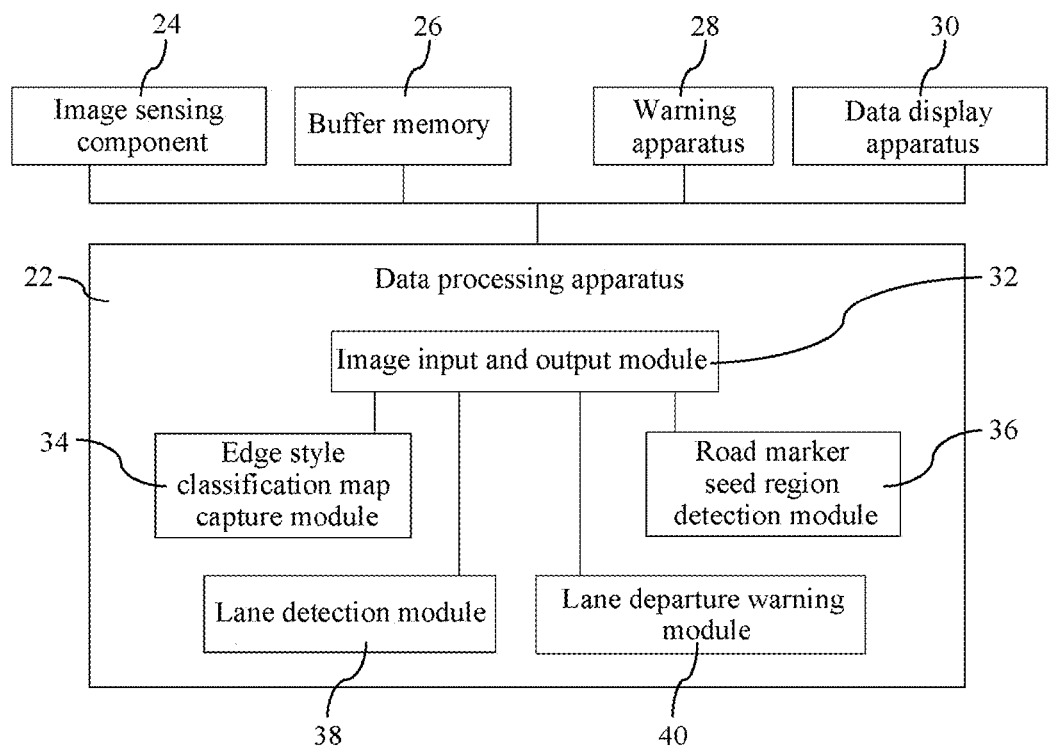
FIG. 1 is a block diagram of a lane departure warning system according to the present invention.

FIG. 1 is a block diagram of a lane departure warning system according to the present invention. In FIG. 1, the lane departure warning system 20 includes a data processing apparatus 22, an image sensing component 24, a buffer memory 26, a warning apparatus 28, and a data display apparatus 30. The data processing apparatus 22 may be a program library, which may be executed by a CPU; and may also be a hardware accelerator, which improves execution efficiency of the lane departure warning system 20.

The data processing apparatus 22 includes an image input and output module 32, an edge style classification map capture module 34, a road marker seed region detection module 36, a lane detection module 38, and a lane departure warning module 40.

The edge style classification map capture module 34 calculates a horizontal gradient absolute value, a vertical gradient absolute value, and an edge direction value of each pixel of an image, and compares the horizontal gradient absolute value, the vertical gradient absolute value, and the edge direction value of each pixel with multiple thresholds, so as to classify each pixel into one of multiple edge styles. FIG. 2A and FIG. 2C are schematic diagrams of images shot by an image sensing component according to the present invention, FIG. 2B and FIG. 2D are schematic diagrams of the images classified according to edge styles according to the present invention. FIG. 2A and FIG. 2C show the original images to be classified according to the edge styles, and the multiple edge styles are shown in FIG. 2B and FIG. 2D. For ease of showing, five edge styles (ES0~ES4) are shown in different gray-scale values.

In most cases, a conventional method for detecting a lane marker is to analyze a gradient of the image; however, in a more complex image (such as an image including a vehicle, a shadow, or a man-made object), excessive edge pixels may be detected, which increase difficulties in subsequently detecting a lane. In view of this, the present invention puts forward an Edge Style Map (ESM), which can effectively classify the pixels in the image into at least five edge styles according to the characteristics of the pixels, and the styles are as follows, $$ES(x, y) = \begin{cases} 0(\text{Non edge}), & \text{if}(\text{Max}(\Delta AHG(x, y), \Delta AVG(x, y)) < Th_{E1}) \\ 1(\text{Soft edge}), & \text{else if}(\text{Max}(\Delta AHG(x, y), \Delta AVG(x, y)) < Th_{E2}) \\ 2(\text{Horizontal edge}), & \text{else if}(HdV(x, y) < Th_{E3}) \\ 3(\text{diagonal edge}), & \text{else if}(HdV(x, y) < Th_{E4}) \\ 4(\text{Vertical edge}), & \text{otherwise} \end{cases}$$

where, $ES(x,y)$ is a classification result of an edge style of a pixel coordinate position point $(x,y)$ in the image; $AHG(x,y)$ and $AVG(x,y)$ are respectively a horizontal gradient absolute value and a vertical gradient absolute value of the pixel point $(x,y)$, whose value ranges are $0 \leq AHG(x,y) \leq 255$ and $0 \leq AVG(x,y) \leq 255$ respectively; $HdV(x,y)$ is an edge direction value, and is a ratio of the horizontal gradient absolute value $AHG(x,y)$ to the vertical gradient absolute value $AVG(x,y)$, whose value range is $0 \leq HdV(x,y) \leq \infty$; and $Th_{E1}$, $Th_{E2}$, $Th_{E3}$, and $Th_{E4}$ are four thresholds, whose ranges are $5 \leq Th_{E1} \leq 8$, $12 \leq Th_{E2} \leq 16$, $0.4 \leq Th_{E3} \leq 0.6$, and $1.8 \leq Th_{E4} \leq 2.2$ respectively.

Figure 3:
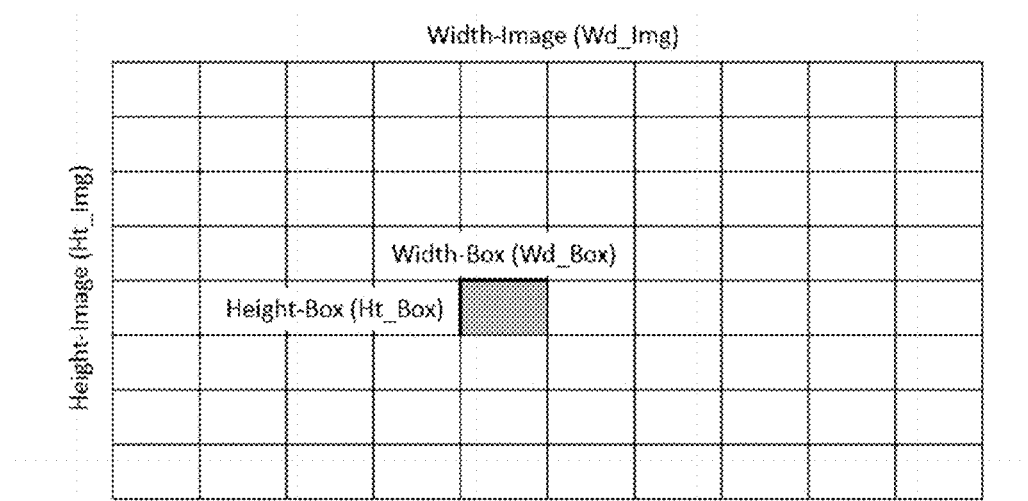
FIG. 3 is a schematic diagram of dividing an image into multiple sub-boxes according to the present invention.

The road marker seed region detection module 36 divides the image into several sub-boxes, as shown in FIG. 3, which is a schematic diagram of dividing the image into several sub-boxes according to the present invention. In FIG. 3, to obtain the best result, it is found after multiple experiments that the following dividing strategy can provide the best result when the lane is detected, where (Wd_Img, Ht_Img) are (width, height) of the image, and (Wd_Box, Ht_Box) are (width, height) of the sub-box. The sub-box is indicated as follows:

$$(0.08 \times \text{Wd\_Img}) \leq \text{Wd\_Box} \leq (0.14 \times \text{Wd\_Img})$$

$$(0.08 \times \text{Ht\_Img}) \leq \text{Ht\_Box} \leq (0.12 \times \text{Ht\_Img})$$

$$1.5 \leq \frac{\text{Wd\_Box}}{\text{Ht\_Box}} \leq 3$$

In this embodiment, FIG. 3 is a schematic diagram showing box dividing through non-overlapping. In another embodiment, an overlapping manner may be used to capture the sub-boxes.

Figures 4A, 4B:
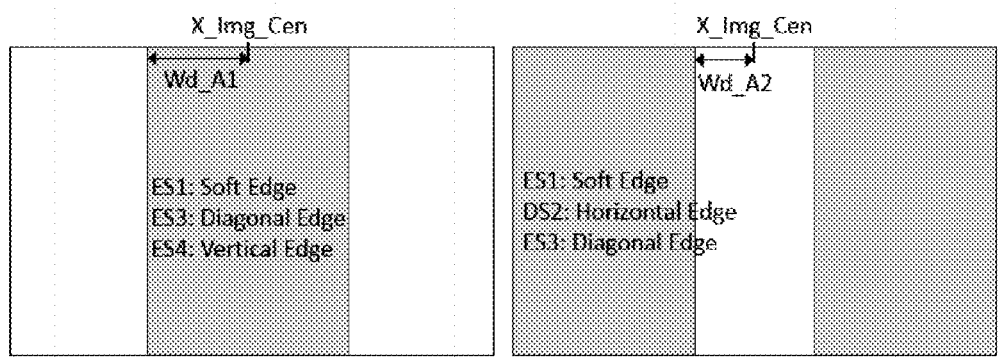
FIG. 4A and FIG. 4B are schematic diagrams showing a reasonable location of evaluating edge styles according to the present invention.

FIG. 4A and FIG. 4B are schematic diagrams showing a reasonable location of evaluating edge styles according to the present invention. In FIG. 4A and FIG. 4B, after edge style classification is performed on an image, all pixels in the image may be divided into the following five styles:

a non-edge (Non-Edge, marked as ES0 herein);

a soft edge (Soft Edge, marked as ES1 herein);

a horizontal edge (Horizontal Edge, marked as ES2 herein);

a diagonal edge (Diagonal Edge, marked as ES3 herein); and a vertical edge (Vertical Edge, marked as ES4 herein).

The road marker seed region detection module 36 defines road marker edges of different styles, and only a part of road marker edges appears in a specific area of the image. For example, the diagonal edge (ES3), the vertical edge (ES4), and the soft edge (ES1) may only appear in a central area of the image, which is shown in a grey area of FIG. 4A; while the horizontal edge (ES2), the diagonal edge (ES3) and the soft edge (ES1) may only appear on two sides of the image, which are shown in grey areas of FIG. 4B. A determining formula of the grey area (an area where the edge appears) is as follows, where X_Img_Cen is a central location of X axis in the image;

$$(0.15 \times Wd\_Im\,g) \leq Wd\_A1 \leq (0.25 \times Wd\_Im\,g)$$

$$(0.15 \times Wd\_Im\,g) \leq Wd\_A2 \leq (0.25 \times Wd\_Im\,g)$$

Figure 5:
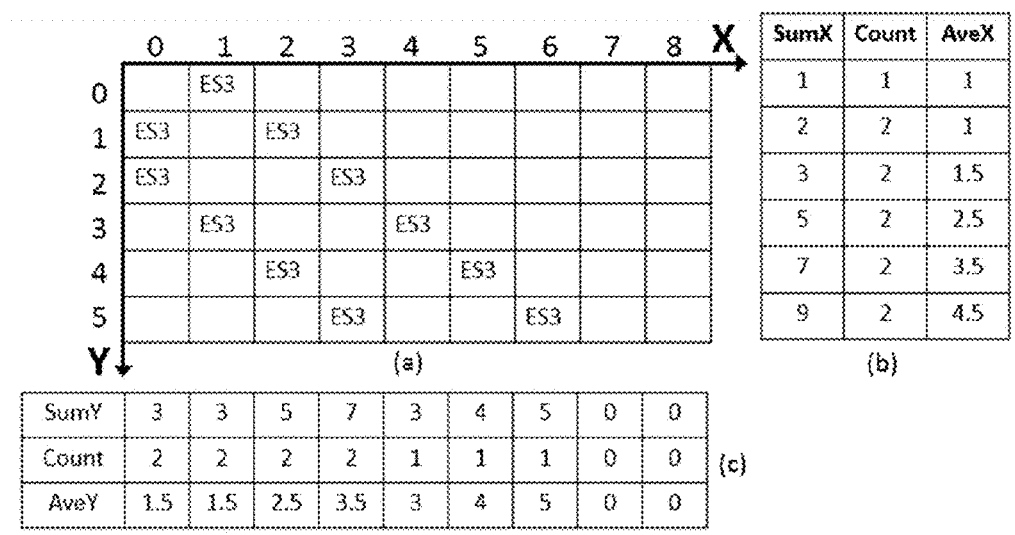
FIG. 5 is a feature illustrative diagram illustrating a row and column reference of a sub-box according to the present invention.

FIG. 5 is a feature illustrative diagram illustrating a row and column reference of a sub-box according to the present invention. To find a road marker seed region, the present invention provides a Line Evaluation (LE) manner to check each sub-box. In brief, an edge style of the sub-box which should be checked is determined according to a location of the sub-box in the image, and then the LE is performed on each edge style.

FIG. 5(a) indicates that a size of the sub-box is 9×6; an original point is on the upper-left side and ES3 is marked in the sub-box, which indicates that the pixel is a diagonal edge. FIG. 5(b) shows a row reference feature list of ES3 in the sub-box, which includes a coordinate sum in X-axis direction (SumX), the count (Count) of ES3, and an average value of coordinates (AveX). FIG. 5(c) is a column reference feature list of ES3 in the sub-box, which includes a coordinate sum in Y-axis direction (SumY), the count (Count) of ES3, and the average value of coordinates (AveY). Then, the road marker seed region detection module 36 checks average values of coordinates in the row and the column reference feature lists. If the average values of the coordinates progressively increase or decrease, it indicates that the sub-box is a road marker seed region; on the contrary, the sub-box may not include a lane marker.

The lane detection module 38 marks the lane marker from the road marker seed region in a thresholding manner, then detects a local lane by using a Minimum Error Method (MEM) strategy, and finally detects a complete lane through lane extension (Lane Extension).

An intensity of the pixel of the lane marker may be higher than that of the pixel of a surrounding road area, and therefore, the lane marker may be obtained by using a thresholding manner. This embodiment uses the following two characteristics, and determines a proper threshold only by using partial pixels (that is, partial pixels in the sub-box). First, there is an edge style constituting a line feature during detection of each road marker seed region; and second, the edge pixels may appear on two sides of road marker edge pixels.

Therefore, the lane detection module 38 first sets, according to an edge style during the detection of the road marker seed region, the intensity of a pixel not having a line feature in the sub-box to be 0, then obtains a non-zero intensity histogram of other pixels, and finally, analyzes the non-zero intensity histogram to obtain the threshold.

FIG. 6A to FIG. 6D are illustrative diagrams of road marker detection according to the present invention. FIG. 6A shows an original pattern of a sub-box with a size of 16×10; FIG. 6B is an edge style classification map of the original pattern of the sub-box, where the numbers 0~4 respectively represent edge styles ES0~ES4; FIG. 6C shows a result after the sub-box is screened according to a line feature. Because only ES2 and ES3 pass the LE (characteristics of progressively increasing/decreasing) check, only pixels of ES2 and ES3 have a non-zero value.

This embodiment uses the simplest analyzing method (calculating an average value of all the non-zero pixels) to obtain a result shown in FIG. 6D. After calculation, an average value of the non-zero intensity of all the pixels in the sub-box in FIG. 6C is 81, and a threshold is set to be 81; therefore, the intensity of all the pixels with the intensity greater than or equal to the threshold 81 in FIG. 6A are reserved in FIG. 6D, so as to obtain a result of the road marker detection. There are various manners of setting the threshold. This embodiment uses the simplest average value manner, which is not intended to limit the present invention.

The lane detection module 38 obtains a local lane through a Local Lane Detection (LLD) algorithm by using the detected lane marker. The LLD algorithm is described as follows:

A. Determine the number of Road Marker Periods (RMP) according to the road marker pixels in each row, and determine locations of pixels in the left-most and in the right-most of the sub-box in each RMP.

B. Row_Tp and Row_Bm are set to indicate an upper row position and a lower row position including the road marker pixels in the sub-box, Row_Ht the maximum row height calculated by finding row heights (Row Height=Row_Bm−Row_Tp+1) of all rows including road marker pixels and then determining the top row Row_Tp and the bottom row Row_Bm, and n=Row_Ht.

C. Find, on the basis of the pixels on the left side of the road marker pixels included in the sub-box, all good row pairs where Row_Ht is equal to n in the sub-box, and deduce, according to a coordinate of the paired Row_Tp and Row_Bm, two parameters (a slope a and an offset b) of a straight line equation (y=ax+b) serving as the local lane, where the good row pair indicates X-axis coordinate values of the paired Row_Tp and Row_Bm, but boundary values of the sub-box cannot serve as the good row pair.

D. Estimate predicted X values (predicted X value) in other rows than the row pair according to the straight line equation (that is, the local lane), estimate an error between the predicted X value and the row, and calculate a total value of errors of all the rows, that is, calculate, in other rows than the paired upper row position and the lower row position in the sub-box, a total value of errors between coordinates of other rows, forming a straight line, of the local lane and coordinates of other rows of the road marker pixels.

E. Execute steps same as step C and step D on the basis of the pixels on the right side of the road marker pixels in the sub-box.

F. Set n=n−1, repeat step C to step F until n<=3.

G. Determine the optimal local lane according to the total value of errors of row pairs and the heights of the row pairs, where the determined optimal local lane has the minimum total value of errors and the maximum row height.

FIG. 7A to FIG. 7D are schematic diagrams of LLD according to the present invention. FIG. 7A to FIG. 7D illustrates that a lane detection module 38 obtains a local lane through an LLD algorithm by using the detected lane marker.

FIG. 7A is a pattern of a sub-box with a size of 16×10, where C0 is a zeroth column, C1 is a 1st column, C15 is a 15th column, R0 is a zeroth row, R1 is a 1st row . . . , R9 is a 9th row; non-blank grids represent road marker pixels; if road marker pixels belong to a same RMP, the road marker pixels may have a same RMD label, for example, R0 has two RMPs, which are successively marked as 0A and 0B.

Figures 7C, 7D:
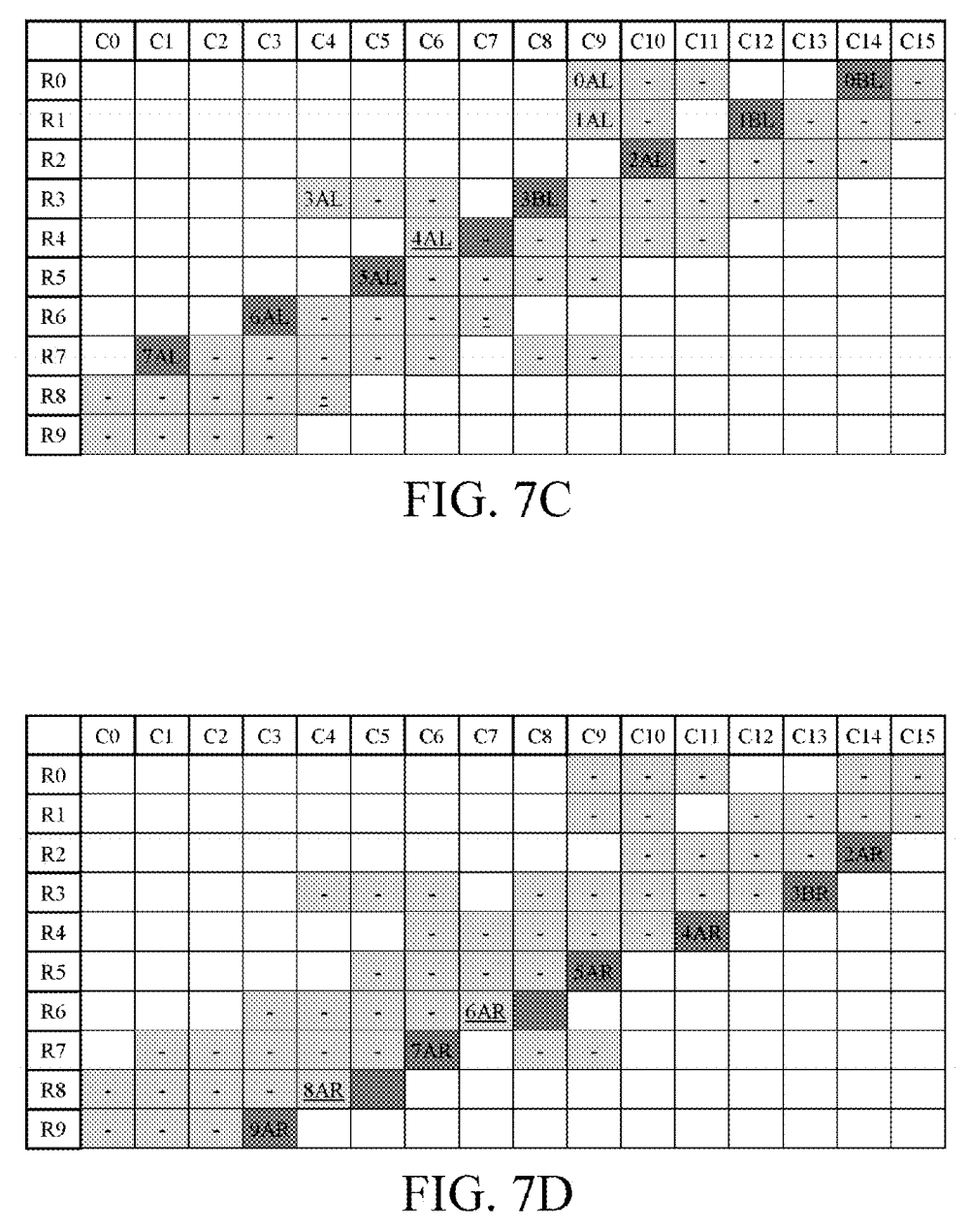

The left-most side and the right-most side of each RMP in the sub-box are shown in FIG. 7B. Based on the left-side pixels of the RMP, a local lane having the maximum row height is shown in FIG. 7C, where R0 and R7 form a row pair Row-Tp and Row_Bm separately. Please note that, the pixels (8AL and 9AL) on the left-most side of the RMP in row R8 and row R9 are just located on an edge (the zeroth column); therefore, the two rows cannot serve as a good row pair.

First, the local lane is detected in the sub-box on the basis of a position of a left pixel of the RMP. The lane detection module 38 obtains, according to 0BL in R0 and 7AL in R7 in the sub-box, two parameters (a slope a and an offset b) of a straight line equation serving as the local lane, and then marks predicted X values in other rows (that is, R1 to R6) into a dark grey scale grid shown in FIG. 7C according to the straight line equation. Therefore, the lane detection module 38 calculates a total value of errors of the row pair as 1 (that is, an error between the dark grey grid in R4 and the 4AL grid), and meanwhile, the lane detection module 38 calculates the Row_Ht of the row pair as 8 (that is, R0 to R7).

FIG. 7D illustrates the LLD on the basis of the right side pixels of the RMP in the sub-box. As described above, the lane detection module 38 calculates a total value of errors of a row pair R2 and R9 as 2 (that is, an error of a dark grey scale grid and 6AR in R6, and an error of a dark grey scale grid and 8AR in R8) according to the obtained straight line equation according to 2AR of R2 and 9AR of R9 in the sub-box, meanwhile, the lane detection module 38 calculates the row height Row_Ht of the row pair R2 and R9 as 8 (that is, R2 to R9).

Step A to step G of the LLD algorithm are repeated. The lane detection module 38 calculates the total value of errors and the corresponding row height Row_Ht according to all row pairs with the Row_Ht>3. After comparison of all the row pairs, it is found that the row pair R0 and R7 (that is, 0BL, 7AL) in FIG. 7C has the minimum total error value and the maximum row height Row_Ht; therefore, the LLD in the sub-box is shown in FIG. 7C.

Figure 8:
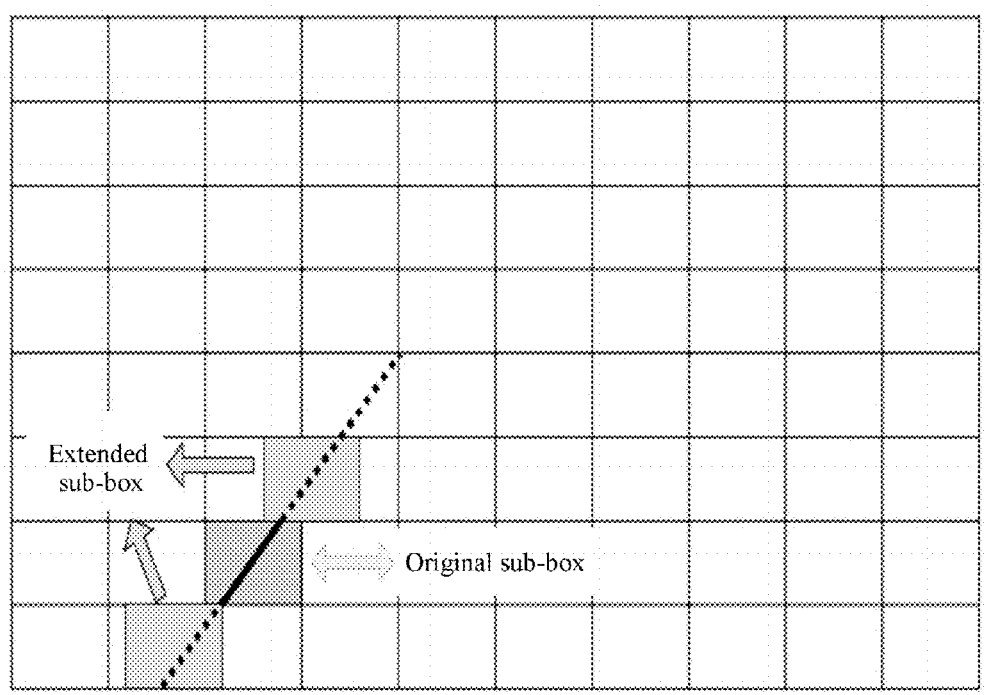
FIG. 8 is a schematic diagram of extending a lane according to the present invention.

FIG. 8 is a schematic diagram of extending a lane according to the present invention. After obtaining the LLD of a certain sub-box (an original sub-box in FIG. 8) in an image, the lane detection module 38 obtains extended sub-boxes in upper and lower extension directions in the sub-box, then the lane detection module 38 extends a local lane (a straight line equation) of the original sub-box toward the upper and lower extension sub-boxes, performs road marker detection on each extended sub-box to obtain a lane marker, and uses an LLD algorithm to obtain the local lane, so as to obtain extended lanes of all the sub-boxes, as shown in FIG. 8.

The lane detection module 38 detects the local lane and the extended lane, so as to detect a complete lane of the image, and marks the complete lane in the actual lane image in the image.

Figures 9A, 9B, 9C:
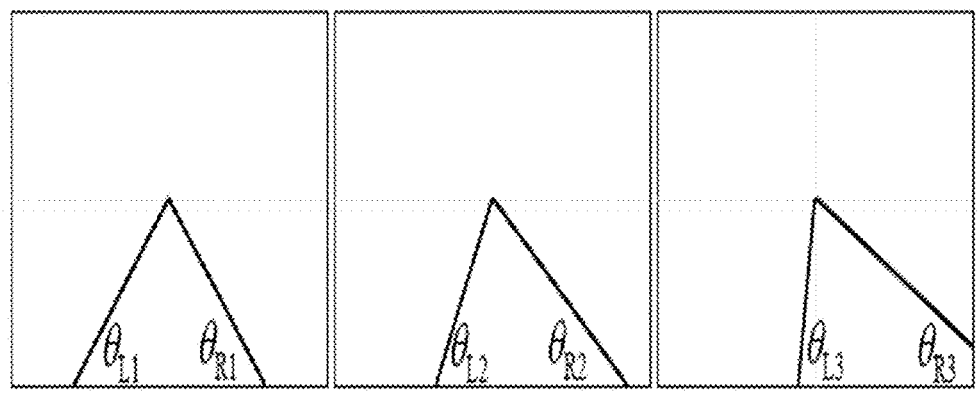
FIG. 9A to FIG. 9C are schematic diagrams of lane departure warning according to the present invention.

FIG. 9A to FIG. 9C are schematic diagrams of lane departure warning according to the present invention. As described above, a complete lane of each image can be obtained. The lane departure warning module 40 analyzes a lane change of continuous images. When an included angle between a local lane and a horizontal direction progressively increases or decreases, it indicates that a vehicle shifts to approach in the direction where the included angle increases or shifts to leave in the direction where the included angle decreases, in this case, the lane departure warning module 40 generates a lane departure warning signal, as shown in FIG. 9A and FIG. 9C.

In FIG. 9A to FIG. 9C, the lane departure warning module 40 detects that an included angle between a local lane on the left side and the horizontal direction progressively increases ($\theta_{L1}<\theta_{L2}<\theta_{L3}$), and an included angle between a local lane on the right side and the horizontal direction progressively decreases ($\theta_{R1}>\theta_{R2}>\theta_{R3}$), in this case, the lane departure warning module 40 finds that the vehicle is shifting to a left lane on an actual road, and generates the lane departure warning signal at the same time.

The image input and output module 32 is connected to the edge style classification map capture module 34, the road marker seed region detection module 36, the lane detection module 38, and the lane departure warning module 40.

The edge style classification map capture module 34 receives pixels of an image from the image input and output module 32, and transmits edge styles of the pixels of the image to the image input and output module 32. The road marker seed region detection module 36 receives from the image input and output module 32 the pixels of the image and their edge styles, outputs to the image input and output module 32 the pixels of the image including a sub-box of a road marker seed region and an image of a complete lane formed by the local lane and an extended lane. The lane detection module 38 receives from the image input and output module 32 the intensity values of the pixels in the sub-box of the road marker seed region, and outputs to the image input and output module 32 a slope and an offset of the local lane and the extended lane. The lane departure warning module 40 receives from the image input and output module 32 the slope and the offset of the local lane, and outputs the lane departure warning signal to the image input and output module 32.

An image sensing component 24 shoots an image of a road, and converts it into multiple pixels of an image in a digital format. The image input and output module 32 reads the pixels of the image from the image sensing component 24. A buffer memory 26 stores the pixels of the image shot by the image sensing component 24. The image input and output module 32 may also read the pixels of the image from the buffer memory 26. A data display apparatus 30 reads from the image input and output module 32 an image of a complete lane formed by the local lane and the extended lane, and displays on the data display apparatus 30 an image where the complete lane is marked on the actual lane image. The image input and output module 32 outputs the lane departure warning signal to a warning apparatus 28, and the warning apparatus 28 sends a departure warning signal according to the lane departure warning signal.

With reference to the foregoing block diagram of the lane departure warning system and the schematic diagrams related to the lane departure warning system, operations of a lane departure warning method of the present invention is described.

Figure 10:
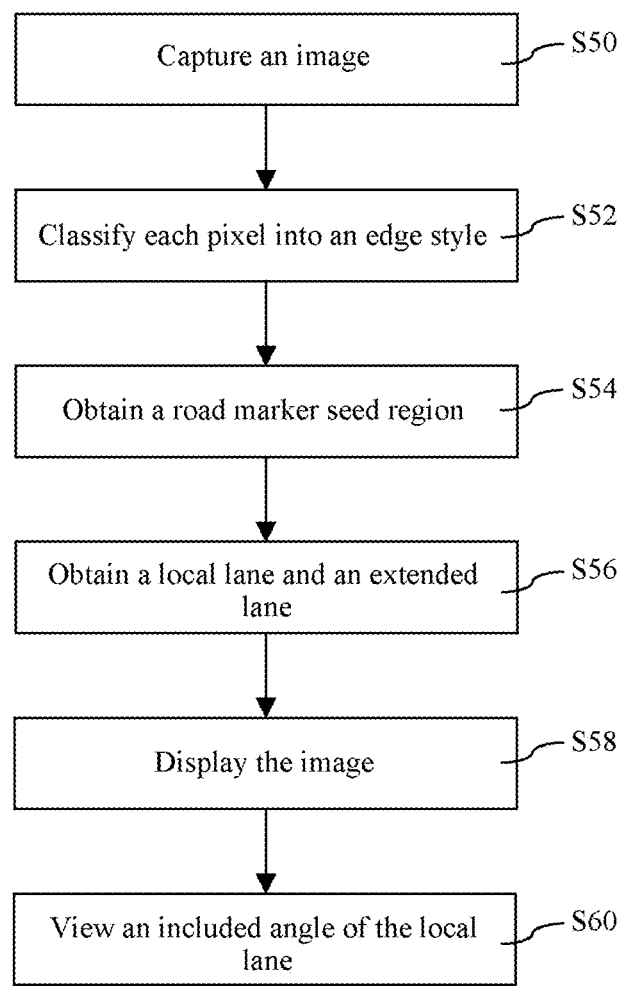
FIG. 10 is a flowchart of a lane departure warning method according to the present invention.

FIG. 10 is a flowchart of a lane departure warning method according to the present invention. In FIG. 10, an image sensing component 24 shoots an image of a road, and converts it into multiple pixels of an image in a digital format. The image sensing component 24 stores the pixels of the image in a buffer memory 26. An image input and output module 32 of a data processing apparatus 22 reads the pixels of the image from the image sensing component 24 or the buffer memory 26 (Step S50).

An edge style classification map capture module 34 of the data processing apparatus 22 reads the pixels of the image from the image input and output module 32. The edge style classification map capture module 34 calculates a horizontal gradient absolute value, a vertical gradient absolute value, and an edge direction value of each pixel of the image.

The edge style classification map capture module 34 compares the horizontal gradient absolute value, the vertical gradient absolute value, and the edge direction value of each pixel with the foregoing multiple thresholds $Th_{E1}$, $Th_{E2}$, $Th_{E3}$, and $Th_{E4}$, so as to classify each pixel into one of the foregoing five edge styles (ES0~ES4) (Step S52).

FIG. 2A and FIG. 2C show images shot by the image sensing component, FIG. 2B and FIG. 2D show images classified according to the edge styles, and FIG. 2A and FIG. 2C show the original images to be classified according to the edge styles, and the multiple edge styles are shown in FIG. 2B and FIG. 2D. For ease of showing, the five edge styles (ES0 ~ES4) are shown in different gray-scale values.

A road marker seed region detection module 36 divides the image into several sub-boxes, as shown in FIG. 3.

In FIG. 4A and FIG. 4B, after the edge style classification map capture module 34 performs the edge style classification on an image, all the pixels in the image may be classified into five styles.

The road marker seed region detection module 36 defines road marker edges of different styles, and only a part of the road marker edges appears in a specific area of the image. For example, a diagonal edge (ES3), a vertical edge (ES4), and a soft edge (ES1) may only appear in a central area of the image, which is shown in a grey area of FIG. 4A; while a horizontal edge (ES2), a diagonal edge (ES3) and a soft edge (ES1) may only appear on two sides of the image, which are shown in grey areas of FIG. 4B.

The road marker seed region detection module 36 finds a road marker seed region, and uses an LE manner to check each sub-box. In brief, an edge style of the sub-box which should be checked is determined according to a location of the sub-box in the image, and then the LE is performed on each edge style, as shown in FIG. 5.

Then, the road marker seed region detection module 36 checks average values of coordinates in the row and the column reference feature lists. If the average values of the coordinates progressively increase or decrease, it indicates that the sub-box is a road marker seed region; on the contrary, the sub-box may not include a lane marker (step S54).

A lane detection module 38 marks the lane marker from the road marker seed region in a thresholding manner, then detects a local lane by using an MME strategy, and eventually detects a complete lane through lane extension (step S56).

The lane detection module 38 sets, according to the edge style detected in the road marker seed region, the intensity of a pixel not having a line feature in the sub-box to be 0, and then analyzes the characteristic of the pixels with non-zero intensity to obtain the threshold.

This embodiment uses the simplest analyzing method (calculating an average value of all the non-zero pixels) to obtain a result shown in FIG. 6D. After calculation, an average value of all the pixels with non-zero intensity in the sub-box in FIG. 6C is 81, and a threshold is set to be 81; therefore, the intensity of all the pixels with the intensity greater than or equal to 81 in FIG. 6A is reserved in FIG. 6D, so as to obtain a result of road marker detection. There are many manners for histogram analyzing. This embodiment uses the simplest average value manner, which is not intended to limit the present invention.

The lane detection module 38 obtains a local lane through an LLD algorithm by using the detected lane marker. FIG. 7A to FIG. 7D illustrates that the lane detection module 38 obtains the local lane through the LLD algorithm by using the detected lane marker.

After obtaining the LLD of a certain sub-box (an original sub-box in FIG. 8) in an image, the lane detection module 38 obtains extended sub-boxes in upper and lower extension directions in the sub-box, then the lane detection module 38 extends the local lane (a straight line equation) of the original sub-box toward the upper and lower extension sub-boxes, performs the road marker detection on each extended sub-box to obtain the lane marker, and uses the LLD algorithm to obtain the local lane, so as to obtain extended lanes of all the sub-boxes, as shown in FIG. 8.

The lane detection module 38 detects the local lane and the extended lane, so as to detect a complete lane of the image, and marks the complete lane in the lane image in the image.

The lane detection module 38 transmits the image showing the complete lane marked in the lane image in the image to the image input and output module 32; the data display apparatus 30 reads from the image input and output module 32 the image of the complete lane including the local lane and the extended lane, and displays on the data display apparatus 30 an image where the complete lane is marked on the actual lane image (Step S58).

As described above, a complete lane of each image can be obtained. The lane departure warning module 40 analyzes a lane change of continuous images. When an included angle between the local lane and a horizontal direction progressively increases or decreases, it indicates that a vehicle shifts to approach in the direction where the included angle increases or shifts to leave in the direction where the included angle decreases, in this case, the lane departure warning module 40 generates a lane departure warning signal, as shown in FIG. 9A and FIG. 9C.

In FIG. 9A and FIG. 9C, the lane departure warning module 40 detects that an included angle between a local lane on the left side and the horizontal direction progressively increases ($\theta_{L1} < \theta_{L2} < \theta_{L3}$), and an included angle between a local lane on the right side and the horizontal direction progressively decreases ($\theta_{R1} > \theta_{R2} > \theta_{R3}$), in this case, the lane departure warning module 40 finds that the vehicle is shifting to a left lane on an actual road, and generates the lane departure warning signal (Step S60).

When a vehicle shifts from the lane, the lane departure warning module 40 outputs the generated lane departure warning signal to the image input and output module 32. The image input and output module 32 outputs the lane departure warning signal to the warning apparatus 28. In this case, the warning apparatus 28 sends a departure warning signal according to the lane departure warning signal.

The objectives of the present invention are to provide a lane departure warning system and method, with the following advantages: under a circumstance that there is no obvious gradient change or light is reflected or an obstacle exists, by using an edge style classification map, and through road marker seed region detection and lane detection, edge pixels of a lane can be detected and the road marker edge pixels can be identified, thereby determining a complete lane, and effectively finding an ROI to simplify a procedure of the lane detection.

Although the present invention is described above with reference to preferred embodiments and exemplary drawings, the present invention shall not be limited thereto. Any modification, omission, and change made to aspects and embodiment content of the present invention by a person skilled in the prior art shall fall within the scope of the patent.

What is claimed is:

1. A lane departure warning system, capturing multiple pixels of an image for data processing, wherein the lane departure warning system comprising:

an edge style classification map capture module, for calculating a horizontal gradient absolute value, a vertical gradient absolute value, and an edge direction value of each pixel of the image, and comparing the horizontal gradient absolute value, the vertical gradient absolute value, and the edge direction value of each pixel with multiple thresholds, so as to classify each pixel into one of edge styles;

a road marker seed region detection module, for dividing the image into multiple sub-boxes, performing line feature evaluation on a pixel of the same edge style in the sub-box, so as to determine the edge styles with the line feature, and obtaining a sub-box of a road marker seed region; and a lane detection module, for determining an intensity threshold on the basis of partial pixels with the line feature in the sub-box of the road marker seed region, reserving pixels with an intensity value greater than or equal to the intensity threshold in the sub-box as multiple road marker pixels, obtaining a slope and an offset of a local lane through a straight line equation by using coordinate positions of the road marker pixels in the sub-box, and extending the local lane to other sub-boxes to obtain an extended lane.

2. The lane departure warning system according to claim 1, wherein the edge style classifications are as follows:

$$ES(x, y) = \begin{cases} 0(\text{Non edge}), & \text{if}(\text{Max}(\Delta AHG(x, y), \Delta AVG(x, y)) < Th_{E1}) \\ 1(\text{Soft edge}), & \text{else if}(\text{Max}(\Delta AHG(x, y), \Delta AVG(x, y)) < Th_{E2}) \\ 2(\text{Horizontal edge}), & \text{else if}(HdV(x, y) < Th_{E3}) \\ 3(\text{diagonal edge}), & \text{else if}(HdV(x, y) < Th_{E4}) \\ 4(\text{Vertical edge}), & \text{otherwise} \end{cases}$$

wherein, ES(x,y) is a classification result of an edge style of a pixel coordinate position point (x,y) in the image, AHG(x,y) and AVG(x,y) are respectively a horizontal gradient absolute value and a vertical gradient absolute value of the pixel point (x,y), whose value ranges are $0 \leq AHG(x,y) \leq 255$ and $0 \leq AVG(x,y) \leq 255$ respectively, HdV(x,y) is an edge direction value, and is a ratio of the horizontal gradient absolute value AHG(x,y) to the vertical gradient absolute value AVG(x,y), whose range is $0 \leq HdV(x,y) \leq \infty$; and $Th_{E1}, Th_{E2}, Th_{E3},$ and $Th_{E4}$ are four thresholds, whose ranges are $5 \leq Th_{E1} \leq 8$, $12 \leq Th_{E2} \leq 16$, $0.4 \leq Th_{E3} \leq 0.6$, and $1.8 \leq Th_{E4} \leq 2.2$.

3. The lane departure warning system according to claim 1, wherein the road marker seed region detection module performing line feature evaluation is performing, in the same axial direction, an operation on the pixels of the same edge styles in the sub-box, so as to obtain multiple coordinate sums, counts and coordinate average values; when the coordinate average values in all axial directions progressively increase or decrease, it indicates that the sub-box is the road marker seed region, wherein the coordinate sum is a sum of coordinates of the pixels of the same edge style in the same axial direction, the count is the number of the pixels of the same edge style in the same axial direction, and the coordinate average value is a ratio of the coordinate sum to the count.

4. The lane departure warning system according to claim 1, wherein a step of obtaining, by the lane detection module, the local lane according to a Local Lane Detection (LLD) algorithm comprises the following steps:

A. determining the number of Road Marker Periods (RMP) according to the road marker pixels in each row of the sub-box, and determining locations of pixels, in the left-most and the right-most of the sub-box, among the road marker pixels;

B. finding rows comprising the road marker pixels in the sub-box, determining an upper row position and a lower row position comprising the road marker pixels in the sub-box, and calculating the row height according to the upper row position and the lower row position;

C. pairing, on one side formed by the road marker pixels in the sub-box, all road marker pixels in the upper row position and the lower row position of the row height, and obtaining a slope and an offset of the local lane through a straight line equation by using the paired road marker pixels in the upper row position and the lower row position;

D. calculating, in other rows than the paired upper row position and the lower row in the sub-box, a total value of errors of linear coordinates of other rows of the local lane and coordinates of other rows of the road marker pixels;

E. if the other side formed by the road marker pixels in the sub-box is not processed, executing step C and step D; if the side is processed, executing step F;

F. subtracting one from the row height, and repeating step C to step F until the row height is less than or equal to three; and G. determining that the optimal local lane has the minimum total value of errors and the maximum row height.

5. The lane departure warning system according to claim 1, wherein the lane detection module extends two ends of the local lane to an adjacent sub-box to obtain an extended lane.

6. The lane departure warning system according to claim 5, further comprising:

a lane departure warning module, for viewing multiple continuous images, and when an included angle between a local lane of the multiple continuous images and a horizontal direction progressively increases or decreases, generating a lane departure warning signal; and an image input and output module, electrically connected to the edge style classification map capture module, the road marker seed region detection module, the lane detection module, and the lane departure warning module;

wherein the edge style classification map capture module receives the pixels of the image from the image input and output module, and transmits the edge styles of the pixels of the image to the image input and output module; the road marker seed region detection module receives from the image input and output module the pixels of the image and the edge styles, and outputs to the image input and output module the pixels of the image comprising the sub-box of the road marker seed region; the lane detection module receives from the image input and output module an intensity value of the pixels in the sub-box of the road marker seed region, and outputs a slope and an offset of the local lane to the image input and output module; and the lane departure warning module receives from the image input and output module the slope and the offset of the local lane and the extended lane, and outputs the lane departure warning signal to the image input and output module.

7. The lane departure warning system according to claim 6, further comprising:

an image sensing component, for shooting the image of a lane, and converting it into the pixels of the image in a digital format, wherein the image input and output module reads the pixels of the image;

a buffer memory, for storing the pixels of the image shot by the image sensing component, wherein the image input and output module reads the pixels of the image;

a data display apparatus, for reading, from the image input and output module, an image comprising the local lane and the extended lane and displaying the image; and a warning apparatus, wherein when the image input and output module outputs the lane departure warning signal to the warning apparatus, the warning apparatus sends a departure warning signal according to the lane departure warning signal.

8. A lane departure warning method, capturing pixels of an image for data processing, wherein the lane departure warning method comprising the following steps:

calculating a horizontal gradient absolute value, a vertical gradient absolute value, and an edge direction value of each pixel of an image, and comparing the horizontal gradient absolute value, the vertical gradient absolute value, and the edge direction value of each pixel with multiple edge styles, so as to classify each pixel into one of edge styles;

dividing the image into multiple sub-boxes, defining, in a specific area of the image, an edge style of a pixel of each sub-box, and performing line feature evaluation on the pixels of the same edge style in the sub-box, so as to determine the edge style with the line feature, and obtain a sub-box of a road marker seed region; and determining an intensity threshold on the basis of partial pixels with the line feature in the sub-box of the road marker seed region, reserving pixels with an intensity value greater than or equal to the intensity threshold in the sub-box as multiple road marker pixels, obtaining a slope and an offset of a local lane through a straight line equation by using coordinate positions of the road marker pixels in the sub-box, and extending the local lane to other sub-boxes to obtain an extended lane.

9. The lane departure warning method according to claim 8, wherein the edge style classifications are as follows:

$$ES(x, y) = \begin{cases} 0(\text{Non edge}), & \text{if}(\text{Max}(\Delta AHG(x, y), \Delta AVG(x, y) < Th_{E1}) \\ 1(\text{Soft edge}), & \text{else if}(\text{Max}(\Delta AHG(x, y), \Delta AVG(x, y) < Th_{E2}) \\ 2(\text{Horizontal edge}), & \text{else if}(HdV(x, y) < Th_{E3}) \\ 3(\text{diagonal edge}), & \text{else if}(HdV(x, y) < Th_{E4}) \\ 4(\text{Vertical edge}), & \text{otherwise} \end{cases}$$

wherein ES(x,y) is a classification result of an edge style of a pixel coordinate position point (x,y) in the image; AHG(x,y) and AVG(x,y) are respectively a horizontal gradient absolute value and a vertical gradient absolute value of the pixel point (x,y), whose value ranges are $0 \leq AHG(x,y) \leq 255$ and $0 \leq AVG(x,y) \leq 255$ respectively; HdV(x,y) is an edge direction value, and is a ratio of the horizontal gradient absolute value AHG(x,y) to the vertical gradient absolute value AVG(x,y), whose range is $0 \leq HdV(x,y) \leq \infty$; and $Th_{E1}, Th_{E2}, Th_{E3},$ and $Th_{E4}$ are four thresholds, whose ranges are $5 \leq Th_{E1} \leq 8$, $12 \leq Th_{E2} \leq 16$, $0.4 \leq Th_{E3} \leq 0.6$, and $1.8 \leq Th_{E4} \leq 2.2$.

10. The lane departure warning method according to claim 8, wherein the step of performing the line feature evaluation is performing, in the same axial direction, an operation on the pixels of the same edge styles in the sub-box, so as to obtain multiple coordinate sums, counts and coordinate average values; when the coordinate average values in all axial directions progressively increase or decrease, it indicates that the sub-box is the road marker seed region, wherein the coordinate sum is a sum of coordinates of the pixels of the same edge style in the same axial direction, the count is the number of the pixels of the same edge style in the same axial direction, and the coordinate average value is a ratio of the coordinate sum to the count.

11. The lane departure warning method according to claim 8, wherein the obtaining the local lane according to a Local Lane Detection (LLD) algorithm comprises the following steps:

A. determining the number of Road Marker Periods (RMP) according to the road marker pixels in each row of the sub-box, and determining locations of pixels, in the left-most and the right-most of the sub-box, among the road marker pixels;

B. finding rows comprising the road marker pixels in the sub-box, determining an upper row position and a lower row position comprising the road marker pixels in the sub-box, and calculating the row height according to the upper row position and the lower row position;

C. pairing, on one side formed by the road marker pixels in the sub-box, all road marker pixels in the upper row position and the lower row position of the row height, and obtaining a slope and an offset of the local lane through a straight line equation by using the paired road marker pixels in the upper row position and the lower row position;

D. calculating, in other rows than the paired upper row position and the lower row in the sub-box, a total value of errors of linear coordinates of other rows of the local lane and coordinates of other rows of the road marker pixels;

E. if the other side formed by the road marker pixels in the sub-box is not processed, executing step C and step D; if the side is processed, executing step F;

F. subtracting one from the row height, and repeating step C to step F until the row height is less than or equal to three; and G. determining that the optimal local lane has the minimum total value of errors and the maximum row height.

12. The lane departure warning method according to claim 8, wherein two ends of the local lane extends to an adjacent sub-box to obtain an extended lane.

13. The lane departure warning method according to claim 12, further comprising the following steps:

viewing multiple continuous images, and when an included angle between a local lane of the multiple continuous images and a horizontal direction progressively increases or decreases, generating a lane departure warning signal.

14. The lane departure warning method according to claim 13, further comprising the following steps:

shooting an image of the lane, and converting it into pixels of the image in a digital format;

storing the pixels of the image shot by the image sensing component;

reading the image comprising the local lane and the extended lane and displaying the image; and sending a departure warning signal according to the lane departure warning signal.

* * * * *